March 1, 1966  C. S. MERTLER  3,238,486
THERMALLY VARIABLE RESISTANCE

Original Filed March 2, 1960  2 Sheets-Sheet 1

INVENTOR.
CHARLES S. MERTLER
BY *Woodling, Krost,*
*Granger and Rust,*
ATTORNEYS March 1, 1966   C. S. MERTLER   3,238,486
THERMALLY VARIABLE RESISTANCE
Original Filed March 2, 1960   2 Sheets-Sheet 2

INVENTOR.
CHARLES S. MERTLER
BY Woodling, Krost,
Granger and Rust,
ATTORNEYS

United States Patent Office 3,238,486
Patented Mar. 1, 1966

3,238,486
THERMALLY VARIABLE RESISTANCE
Charles S. Mertler, Mansfield, Ohio, assignor to Stevens Manufacturing Company, Inc., a corporation of Ohio
Original application Mar. 2, 1960, Ser. No. 12,408, now Patent No. 3,107,288, dated Oct. 10, 1963. Divided and this application Jan. 7, 1963, Ser. No. 249,788
10 Claims. (Cl. 338—25)

This application is a division of my application Serial Number 12,408, filed March 2, 1960, now Patent No. 3,107,288 entitled "Temperature Sensing Unit."

The invention relates in general to a temperature sensing unit and more particularly to the electrical and physical arrangement of a temperature sensing unit which may be used with an electrical heating device. In household ranges, surface units are employed to heat vessels, and in recent years surface units have come into use wherein the heat output is controlled according to the temperature of the vessel. This permits various degress of heat for different cooking needs and most importantly prevents overcooking or burning, for example, if the liquid in the vessel should boil away. In such automatic surface controlled units the temperature of the vessel being heated should be accurately determined. Accordingly, temperature sensing units have been employed generally at the center of the surface unit, but in the past many of these have been unsatisfactory in that they have failed to accurately determine the temperature of the vessel or have had a considerable time lag in sensing the temperature.

Accordingly, an object of the invention is to provide a thermally variable resistance as a temperature control for a surface heating unit wherein a resistance wire is wrapped as a double spiral wire in a single axial thickness between metal members for good heat transfer thereto and to utilize all of a predetermined length of the resistance wire.

Another object of the invention is to provide a temperature sensing unit for a surface unit which will accurately determine the temperature of a vessel heated on the surface unit and with no appreciable time lag.

Still another object of the invention is to provide a rugged and simple temperature sensing unit, which is consistent in operation, and one using solid non-telescoping connections inside the unit to prevent breakage of wires.

Still another object of the invention is to provide a temperature sensing unit for a surface unit which is small and effectively heat insulated from the temperature of the surface unit itself and yet rapidly responsive to change of temperature of the vessel by having a small heat mass.

Still another object of the invention is to provide a temperature sensing unit for a range surface unit wherein the sensing unit may be used with many different manufactured types of surface units and not interfere with the operation or cleaning of any such surface unit and also to provide a ready means of mounting the sensing unit which is compatible with all surface units.

Other objects and a fuller understanding of the invention may be had by referring to the following description and claims, taken in conjunction with the accompanying drawings, in which:

Figure 1:
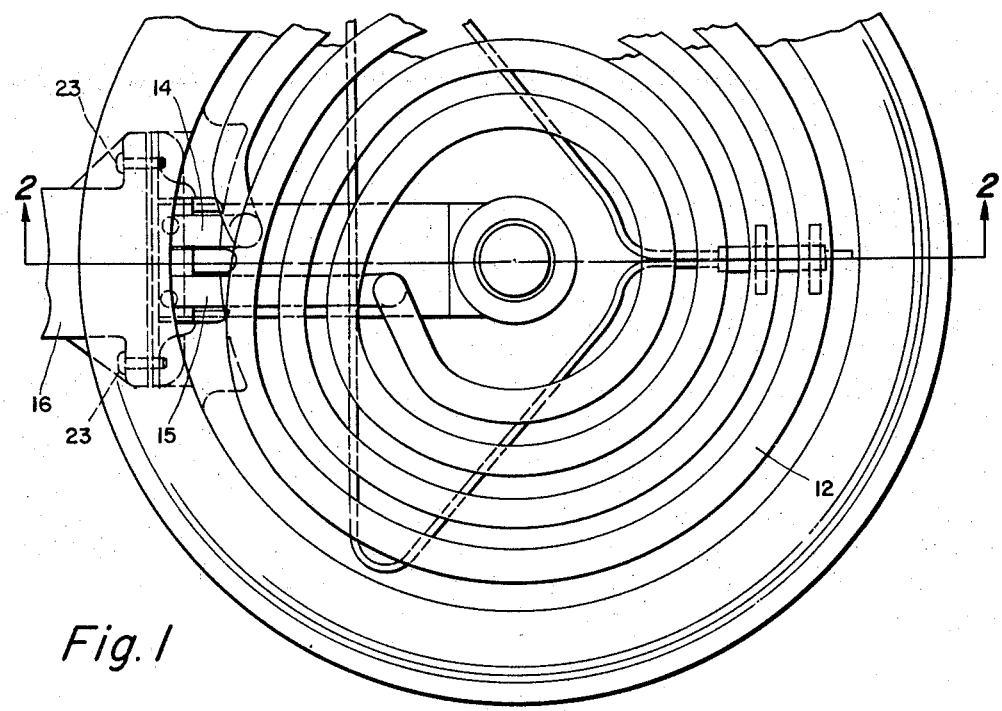
FIGURE 1 is a partial top view of a range surface unit with which the temperature sensing unit of the invention may be used.
Figure 2:
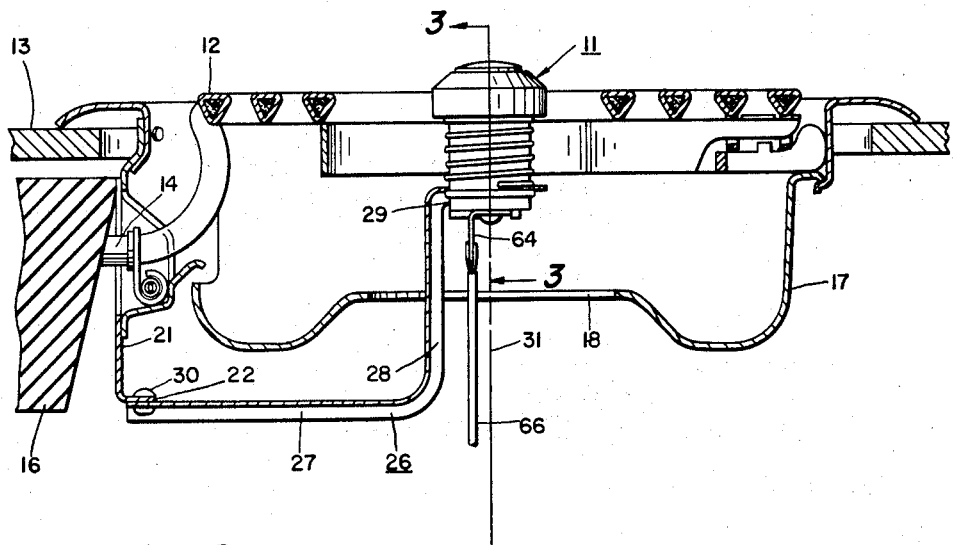
FIGURE 2 is a sectional view on line 2—2 of FIGURE 1.
Figure 3:
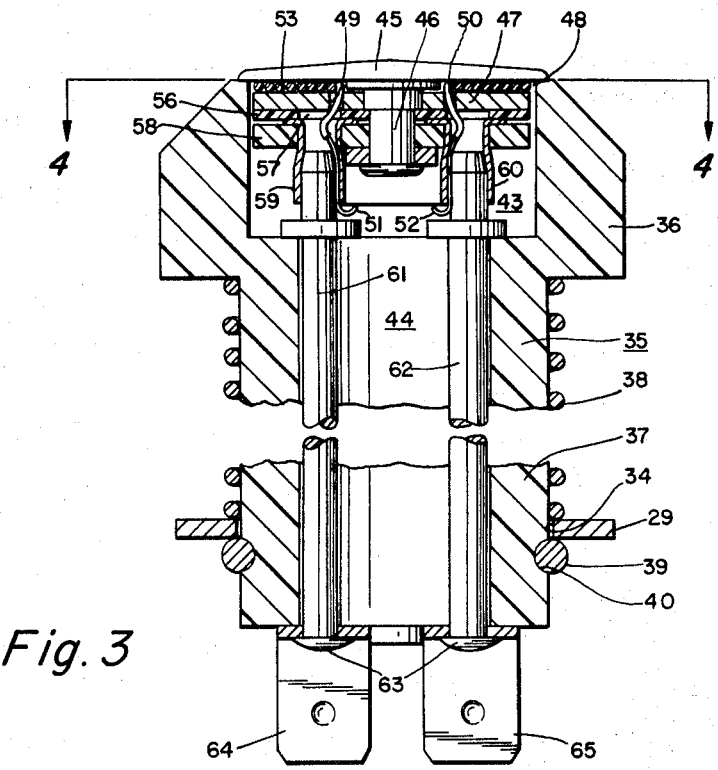
FIGURE 3 is an enlarged sectional view on line 3—3 of FIGURE 2.

The invention is shown in FIGURES 1 and 2 as a temperature sensing unit indicated generally at 11 which may be used with a surface heating unit 12 shown as an electrical heating unit, and mounted on the frame 13 or top of some form of range, such as a household electric range. The surface heating unit 12 may be of any desired construction and is shown as being of generally spiral configuration having first and second ends 14 and 15 which are mechanically connected to a terminal block 16 carried on the frame 13. This terminal block 16 may provide a flexible electrical permanent connection to the surface heating unit 12 or may provide a disconnectable electrical connection for the heating unit 12. There are two such general types of heating units 12 currently on the market and in one the heating unit 12 may be completely removed from the range for cleaning and in others this heating unit 12 may merely be swung out of the way through an arc so that a drip pan 17 underneath the heating units 12 may be cleaned. The present invention of a temperature sensing unit 11 may be used with either type. The drip pan 17 is supported in some manner from the frame 13 below the surface heating unit 12 and includes a central aperture 18.

The temperature sensing unit 11 includes a flat thin plate support 21 which has an L-shaped bottom extension 22. The plate support 21 is thin enough to be mounted at the terminal block 16 by the same screws 23 which mount this terminal block 16. This provides for a convenient mounting of the entire sensing unit 11 by the same means which support the heating unit 12 at the terminal block 16.

A relatively rigid bracket 26 has first, second and third leg portions 27, 28 and 29, respectively, and the end of the first leg portion 27 is fixedly attached to the L-shaped extension 22 by any suitable means, such as the rivets 30. The first leg portion 27 extends generally horizontally under the drip pan 17 and the second leg portion 28 extends generally vertically upwardly through the drip pan aperture 18. This places the third leg portion 29 at a level above the drip pan 17 and it extends generally horizontally underneath the center or axis 31 of the heating unit 12.

Figure 4:
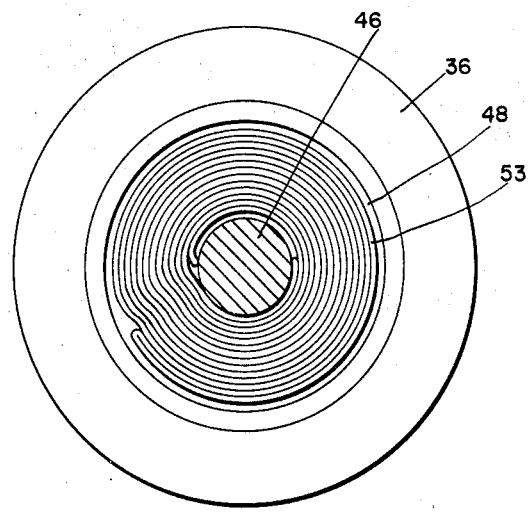
FIGURE 4 is a sectional view on line 4—4 of FIGURE 3.

The third leg portion 29 has a surface defining an aperture 34 on this axis 31. An insulator sensor body 35 has a flanged head 36 and a longitudinally extending shank 37. This shank 37 is cylindrical and is slidably received in the third leg portion 29. A coil compression spring 38 surrounds the shank 37 and engages the head 36 and the third leg portion 29 to urge upwardly the sensor body 35. A snap ring 39 engages a groove 40 in the lower end of the shank 37 so as to retain the body 35 within the bracket 26. A coaxial recess 43 is provided in the upper end of the head 36 and the shank 37 is longitudinally apertured at 44. A metal cap 45 of good heat conductivity is provided at the upper end of the head 36 and a stem 46 is attached to the cap 45. A metal backup member or washer 47 is received on the stem 46 and defines with the underside of the cap 45 an annular wire space 48. Both the cap 45 and the backup washer 47 may be made of aluminum, for example. The metal backup washer 47 has first and second apertures 49 and 50 closely adjacent the stem 46. First and second wire ends 51 and 52 of a resistance wire 53 pass through these apertures 49 and 50 and this resistance wire 53 is wrapped on the stem 46 as a doubled wire in a pancake coil in a single axial thickness in the annular wire space 48. This configuration is best shown in FIGURE 4. This wrapping as a double spiral assures that the two wire ends 51 and 52 may be at the inner periphery of the coiled resistance wire 53 without any crossovers of the wire and also assures that all of the wire 53 of a predetermined length is completely used in the coil in the wire space 48 without having to cut off any of the length of the wire 53 which otherwise might not have gone one more turn around the outer periphery of this coil of wire, if one terminal were at the outer periphery. This assures accuracy in length of the wire 53, and hence, accuracy of the predetermined resistance thereof.

An insulating washer 56 abuts the metal backup washer 47 and it also has apertures 57 for the wire ends 51 and 52 to pass through. An insulating eyelet support washer 58 carries first and second eyelets 59 and 60 and the heads of these eyelets are disposed between the insulating washer 56 and the eyelet support washer 58 for mutual insulation as well as support of these eyelets. First and second terminal pins 61 and 62 are longitudinally disposed in the body 35 and pass through the longitudinal aperture 44. These terminal pins 61 and 62 are solid and non-telescoping and are received in the eyelets 59 and 60, respectively, and frictionally grip the wire ends 51 and 52 by being wedged into the eyelets. The terminal pins extend to the lower end of the body shank 37 and are headed at 63 to receive blade type terminals 64 and 65. These terminals 64 and 65 thus provide external electrical connections to the resistance wire 53 through flexible leads 66.

The insulator sensor body 35 has a relatively small physical size and being made of good heat insulation receives a minimum of heat from the surface heating unit 12. The normal position of the sensor body 35 places the metal cap 45 above the level of the heating unit 12, and thus, when any vessel is placed on the heating unit this compresses the spring 38. The urging of this spring 38 maintains the cap 45 in engagement with the vessel for good heat transmissibility to the cap 45. The resistance wire 53 may be insulated with glass insulation which provides excellent electrical insulation with a minimum of thickness, yet the homogeneity provides relatively good heat conductivity to the wire itself. Actually, only a low voltage need be applied to the resistance wire 53, and accordingly, only low voltage insulation is required. Also, the good heat conductivity of the metal cap 45 and the metal backup washer 47, since they are made of aluminum, and the single layer of resistance wire in intimate contact therebetween, contribute to the rapid heat response of the resistance wire 53. This means that the resistance of this wire 53 readily follows the change in temperature of the vessel being heated by the surface unit 12. Accordingly, the resistance of the resistance wire changes quite appreciably, in the order of 2½ to 1 over the temperature range from room temperature to high cooking temperatures.

The entire temperature sensing unit 11 is rugged, simple and dependable, since no flexible wires are utilized inside the sensor body 35 which might break upon repeated flexing.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermally variable resistance element comprising, in combination, a metal plate,
   a metal back up member,
   means to carry said metal back up member spaced from said metal plate to define an annular wire space therewith,
   an insulated resistance wire having first and second ends with both said ends disposed near the center of said back up member,
   and said resistance wire being spiral wrapped as a doubled wire in a single axial thickness in said annular wire space and with a closed integral end at the outer periphery.

2. A thermally variable resistance element comprising, in combination, a metal plate,
   central stem means fixed to one face of said plate,
   a metal washer carried on said stem means and spaced from said plate to define an annular wire space therewith,
   an insulated resistance wire having first and second ends,
   said resistance wire being spiral wrapped as a doubled wire in a single axial thickness in said annular wire space and with a closed integral end,
   and successive turns lying substantially in engagement with adjacent turns to utilize the complete length of a predetermined length of said resistance wire regardless of the peripheral position of the closed end of said coil relative to said wire ends.

3. A thermally variable resistance element comprising, in combination, a metal plate,
   a metal back up member,
   means to carry said metal back up member spaced from said metal plate to define an annular wire space therewith,
   an insulated resistance wire having first and second ends with both said ends disposed near the center of said back up member,
   said resistance wire being spiral wrapped as a doubled wire in a single axial thickness in said annular wire space and with a closed integral end at the outer periphery,
   and the first turn of said coil being wrapped near the center of said back up member and successive turns lying substantially in engagement with adjacent turns to utilize the complete length of a predetermined length of said resistance wire regardless of the peripheral position of the closed end of said coil relative to said wire ends.

4. A temperature sensing element comprising, in combination, a metal plate of good heat conductivity,
   a central stem fixed to one face of said plate and substantially normal thereto,
   a metal washer of good heat conductivity carried on said stem and spaced from said plate and substantially parallel thereto to define an annular wire space therewith,
   a resistance wire having first and second ends with both said ends disposed close to said stem,
   said resistance wire being spiral wrapped as a doubled wire in a pancake coil in a single axial thickness in said annular wire space and with a turned back on itself closed integral end at the outer periphery,
   and first and second terminals mounted fixed relative to said plate and disposed closely adjacent said stem and said washer and connected to said first and second wire ends, respectively.

5. A thermally variable resistance element comprising, in combination, a metal plate,
   central stem means fixed to one face of said plate,
   a metal washer carried on said stem means and spaced from said plate to define an annular wire space therewith,
   an insulated resistance wire having first and second ends with both said ends disposed close to said stem means,
   said resistance wire being spiral wrapped as a doubled wire in a single axial thickness in said annular wire space and with a closed integral end at the outer periphery,
   and the first turn of said coil being wrapped around said stem means and successive turns lying substantially in engagement with adjacent turns to utilize the complete length of a predetermined length of said resistance wire regardless of the peripheral position of the closed end of said coil relative to said wire ends.

6. A thermally variable resistance element comprising, in combination, a metal plate,
central stem means fixed to one face of said plate,
a metal washer carried on said stem means and spaced from said plate to define an annular wire space therewith,
an insulated resistance wire having first and second ends with both said ends disposed close to said stem means,
said resistance wire being spiral wrapped as a doubled wire in a single axial thickness in said annular wire space and with a closed integral end at the outer periphery,
an apertured insulating plate disposed over said central stem means,
wire apertures in said insulating plate with said wire ends passing therethrough,
a terminal washer having an aperture and disposed on said central stem means,
metal terminals insulatedly carried in said terminal washer,
and means connecting said wire ends to said terminals in said terminal washer.

7. A temperature sensing element comprising, in combination, a metal plate of good heat conductivity,
a central stem fixed to one face of said plate and substantially normal thereto,
a metal washer of good heat conductivity carried on said stem and spaced from said plate and substantially parallel thereto to define an annular wire space therewith,
an insulated resistance wire having first and second ends with both said ends disposed close to said stem,
said resistance wire being spiral wrapped as a doubled wire in a single axial thickness in said annular wire space and with a closed integral end at the outer periphery,
the first turn of said coil being wrapped around said stem and successive turns lying substantially in engagement with adjacent turns to utilize the complete length of a predetermined length of said resistance wire regardless of the peripheral position of the closed end of said coil relative to said wire ends,
an insulating plate having aperture means to be received on said central stem and to pass said wire ends therethrough,
metal terminals insulatedly carried relative to said stem, and means connecting said wire ends to said terminals.

8. A temperature sensing element comprising, in combination, a metal plate of good heat conductivity,
a central stem fixed to one face of said plate and substantially normal thereto,
a metal washer of good heat conductivity carried on said stem and spaced from said plate and substantially parallel thereto to define an annular wire space therewith,
an insulated resistance wire having first and second ends with both said ends disposed close to said stem,
said resistance wire being spiral wrapped as a doubled wire in a single axial thickness in said annular wire space and with a closed integral end at the outer periphery,
the first turn of said coil being wrapped around said stem and successive turns lying substantially in engagement with adjacent turns to utilize the complete length of a predetermined length of said resistance wire regardless of the peripheral position of the closed end of said coil relative to said wire ends,
a terminal washer having an aperture and disposed on said central stem,
metal terminals insulatedly carried in said terminal washer,
and means connecting said wire ends to said terminals in said terminal washer.

9. A temperature sensing element comprising, in combination, a metal plate of good heat conductivity,
a central stem integrally fixed to one face of said plate and substantially normal thereto,
a metal washer of good heat conductivity carried on said stem and spaced from said plate and substantially parallel thereto to define an annular wire space therewith,
an insulated resistance wire having first and second ends with both said ends disposed close to said stem,
said resistance wire being spiral wrapped as a doubled wire in a pancake coil in a single axial thickness in said annular wire space and with a turned back on itself closed integral end at the outer periphery,
the first turn of said coil being wrapped around said stem and successive turns lying substantially in engagement with adjacent turns to utilize the complete length of a predetermined length of said resistance wire regardless of the peripheral position of the closed end of said coil relative to said wire ends,
an apertured insulating plate disposed over said central stem,
wire aperture means in said insulating plate with said wire ends passing therethrough,
a terminal washer having an aperture and disposed on said central stem,
metal terminals insulatedly carried in said terminal washer,
and means connecting said wire ends to said terminals in said terminal washer.

10. A temperature sensing element comprising, in combination, a metal plate of good heat conductivity, a central stem fixed to one face of said plate and substantially normal thereto, a metal washer of good heat conductivity carried on said stem and spaced from said plate and sub stantially parallel thereto to define an annular wire space therewith with an inner periphery adjacent said stem and with an outer periphery, an insulated resistance wire having first and second ends with both said ends disposed at one periphery, said resistance wire being spiral wrapped as a doubled wire in a single axial thickness in said annular wire space and with a closed integral end at the other periphery, the first turn of said coil being wrapped adjacent said stem and successive turns lying substantially in engagement with adjacent turns to utilize the complete length of a predetermined length of said resistance wire regardless of the peripheral position of the closed end of said coil relative to said wire ends, metal terminals insulatedly carried relative to said stem, and means connecting said wire ends to said terminals.

References Cited by the Examiner

UNITED STATES PATENTS

| | | | |
|---|---|---|---|
| 2,703,833 | 3/1955 | Vanvor | 338—28 |
| 2,980,875 | 4/1961 | Sivacek | 338—25 |
| 3,042,783 | 7/1962 | Mertler | 219—20.41 |

RICHARD M. WOOD, *Primary Examiner.*